(12) United States Patent
Ott

(10) Patent No.: US 9,684,144 B2
(45) Date of Patent: Jun. 20, 2017

(54) RAPID DEPLOYMENT PACKAGING FOR OPTICAL FIBER

(71) Applicant: CommScope Technologies LLC, Hickory, NC (US)

(72) Inventor: Michael J. Ott, Hudson, WI (US)

(73) Assignee: CommScope Technologies LLC, Hickory, NC (US)

( * ) Notice: Subject to any disclaimer, the term of this patent is extended or adjusted under 35 U.S.C. 154(b) by 741 days.

(21) Appl. No.: 14/034,821

(22) Filed: Sep. 24, 2013

(65) Prior Publication Data

US 2016/0216472 A1     Jul. 28, 2016

Related U.S. Application Data

(60) Provisional application No. 61/706,969, filed on Sep. 28, 2012, provisional application No. 61/846,286, filed on Jul. 15, 2013.

(51) Int. Cl.
    *G02B 6/00*      (2006.01)
    *G02B 6/46*      (2006.01)
    *G02B 6/44*      (2006.01)
    *G02B 6/48*      (2006.01)
    *G02B 6/54*      (2006.01)

(52) U.S. Cl.
CPC ............ *G02B 6/46* (2013.01); *G02B 6/4457* (2013.01); *G02B 6/4463* (2013.01); *G02B 6/4465* (2013.01); *G02B 6/483* (2013.01); *G02B 6/54* (2013.01)

(58) Field of Classification Search
None
See application file for complete search history.

(56) References Cited

U.S. PATENT DOCUMENTS

| | | | |
|---|---|---|---|
| 2,231,919 | A | 2/1941 | Kent |
| 3,672,006 | A | 6/1972 | Fidrych |
| 3,858,848 | A | 1/1975 | MacFetrich |
| 3,906,619 | A | 9/1975 | Shaffer |
| 4,368,910 | A | 1/1983 | Fidrych |
| 4,453,291 | A | 6/1984 | Fidrych |
| 4,460,159 | A | 7/1984 | Charlebois |

(Continued)

FOREIGN PATENT DOCUMENTS

| | | |
|---|---|---|
| DE | 42 00 865 A1 | 7/1993 |
| JP | 59-177504 | 10/1984 |

(Continued)

OTHER PUBLICATIONS

U.S. Appl. No. 14/038,066, filed Sep. 26, 2013.

*Primary Examiner* — Sung Pak
(74) *Attorney, Agent, or Firm* — Merchant & Gould P.C.

(57) ABSTRACT

An example method for installing fiber optic cables between a fiber distribution hub and a plurality of access points includes: pulling the fiber optic cables from a farthest access point to the fiber distribution hub, with each of the fiber optic cables being of a different length and sized to be positioned adjacent to one of the plurality access points when the fiber optic cables are pulled to the fiber distribution hub; connecting a pulled end of the each of the fiber optic cables to the fiber distribution hub; and connecting a free end of each of the fiber optic cables to a respective access point to connect each of the access points to the fiber distribution hub.

20 Claims, 20 Drawing Sheets

(56) References Cited

U.S. PATENT DOCUMENTS

| | | |
|---|---|---|
| 4,684,161 A | 8/1987 | Egner |
| 4,684,211 A | 8/1987 | Weber |
| 4,736,978 A | 4/1988 | Cielker |
| 5,013,125 A | 5/1991 | Nilsson |
| 5,039,196 A | 8/1991 | Nilsson |
| 5,067,843 A | 11/1991 | Nova |
| 5,122,007 A | 6/1992 | Smith |
| 5,133,583 A | 7/1992 | Wagman |
| 5,245,730 A | 9/1993 | Martin |
| 5,283,930 A | 2/1994 | Krauss |
| 5,308,026 A | 5/1994 | Shaw |
| 5,480,203 A | 1/1996 | Favalora |
| 5,863,083 A | 1/1999 | Giebel |
| 5,938,180 A | 8/1999 | Walsten |
| 6,266,469 B1 | 7/2001 | Roth |
| 6,396,993 B1 | 5/2002 | Giebel |
| 6,398,422 B1 | 6/2002 | Szilagyi |
| 6,719,274 B2 | 4/2004 | Bowling |
| 6,993,237 B2 | 1/2006 | Cooke |
| 7,079,734 B2 | 7/2006 | Seddon |
| 7,246,789 B2 | 7/2007 | Ames |
| 7,481,585 B2 | 1/2009 | Scadden |
| 2002/0146228 A1* | 10/2002 | Afflerbaugh ......... G02B 6/0218 385/135 |
| 2006/0133748 A1 | 6/2006 | Seddon |
| 2008/0240658 A1 | 10/2008 | Leeman |
| 2009/0238534 A1 | 9/2009 | Ahmed |
| 2009/0317047 A1* | 12/2009 | Smith ................. G02B 6/4452 385/135 |
| 2010/0322584 A1 | 12/2010 | Kowalczyk |
| 2011/0135268 A1 | 6/2011 | Rudenick |
| 2011/0311226 A1* | 12/2011 | Smith .................... G02B 6/483 398/45 |
| 2015/0177473 A1* | 6/2015 | Smith ................. G02B 6/4457 385/134 |

FOREIGN PATENT DOCUMENTS

| | | |
|---|---|---|
| WO | WO 2005/072395 A2 | 8/2005 |
| WO | WO 2008/036994 A1 | 4/2008 |
| WO | WO 2009/040567 A1 | 4/2009 |

* cited by examiner

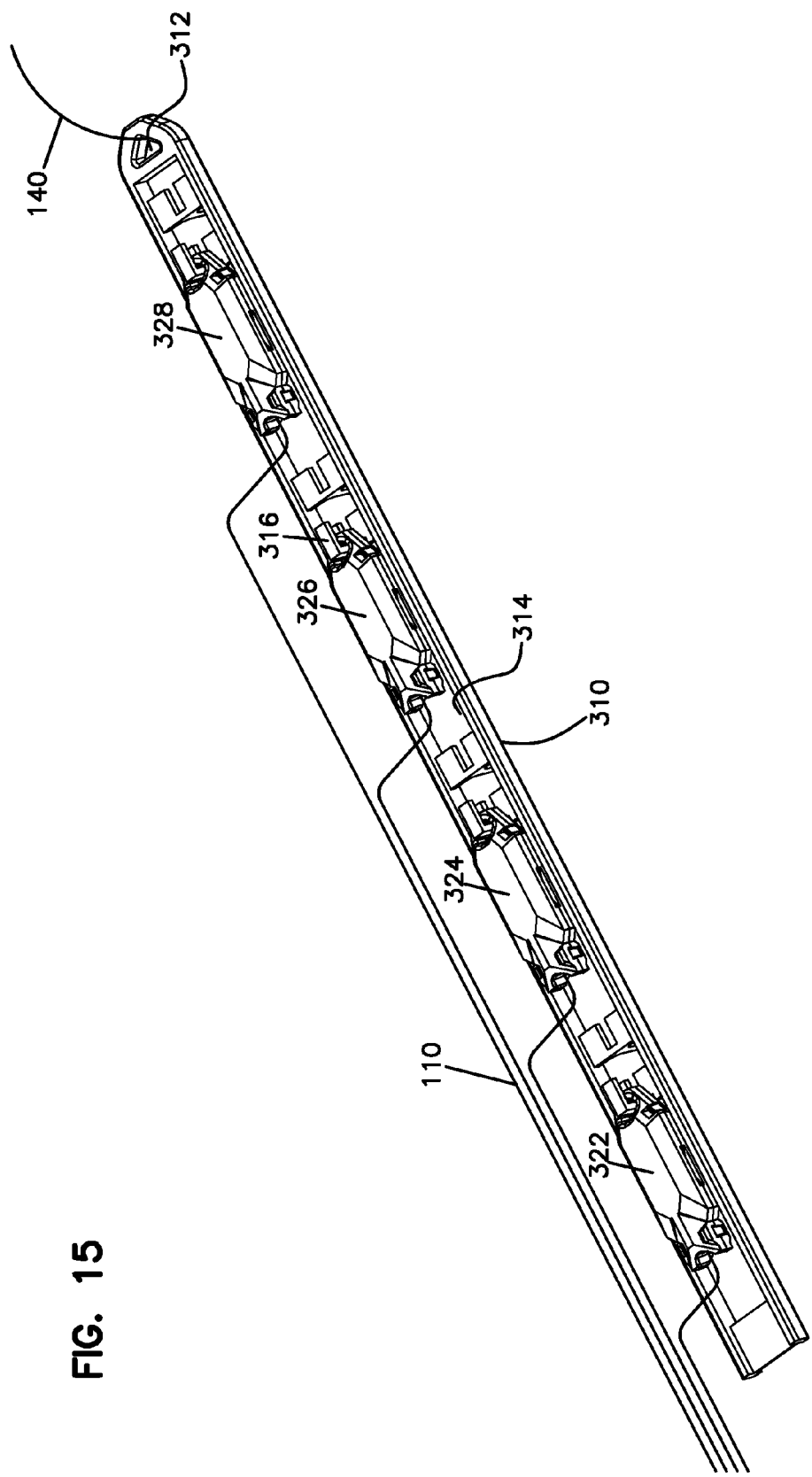

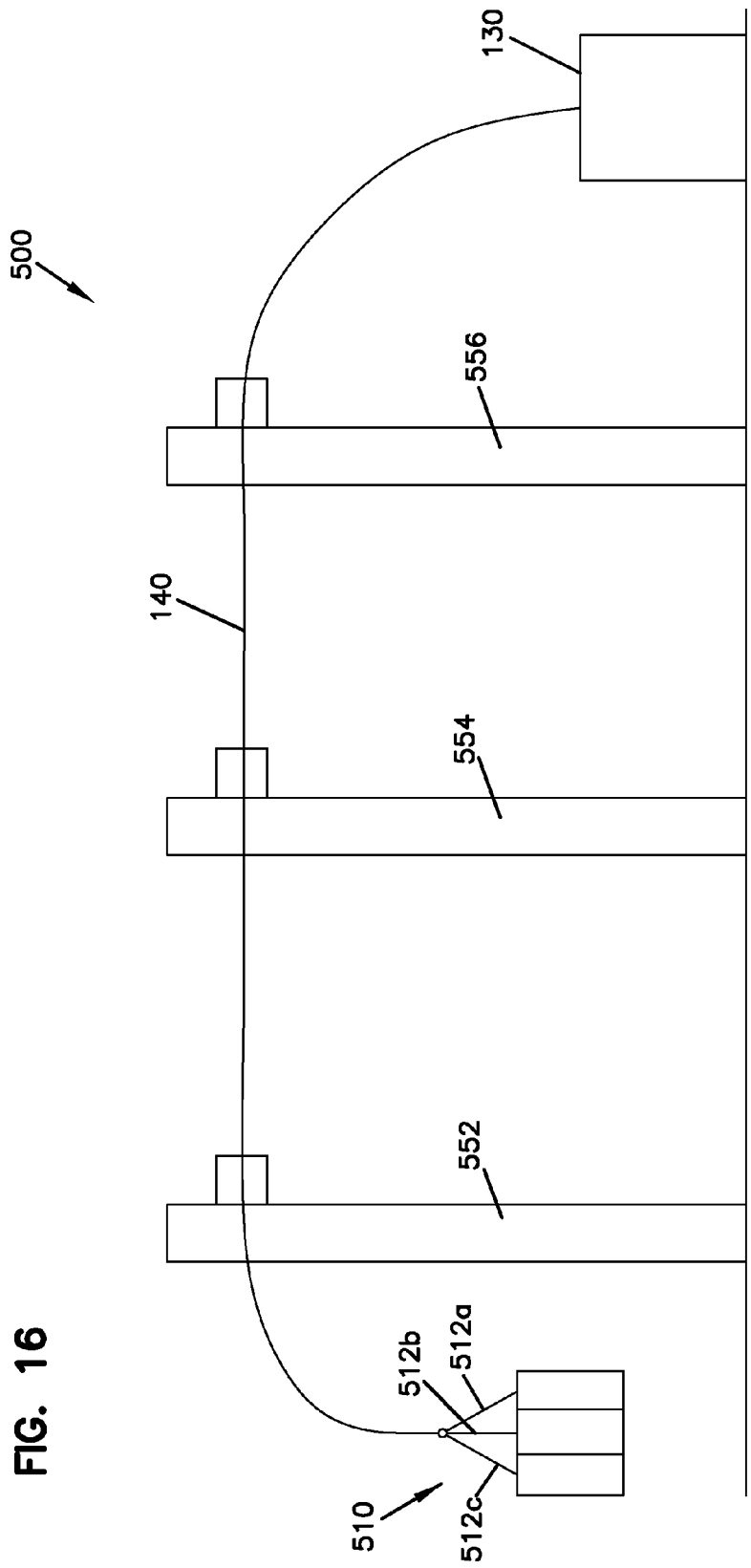

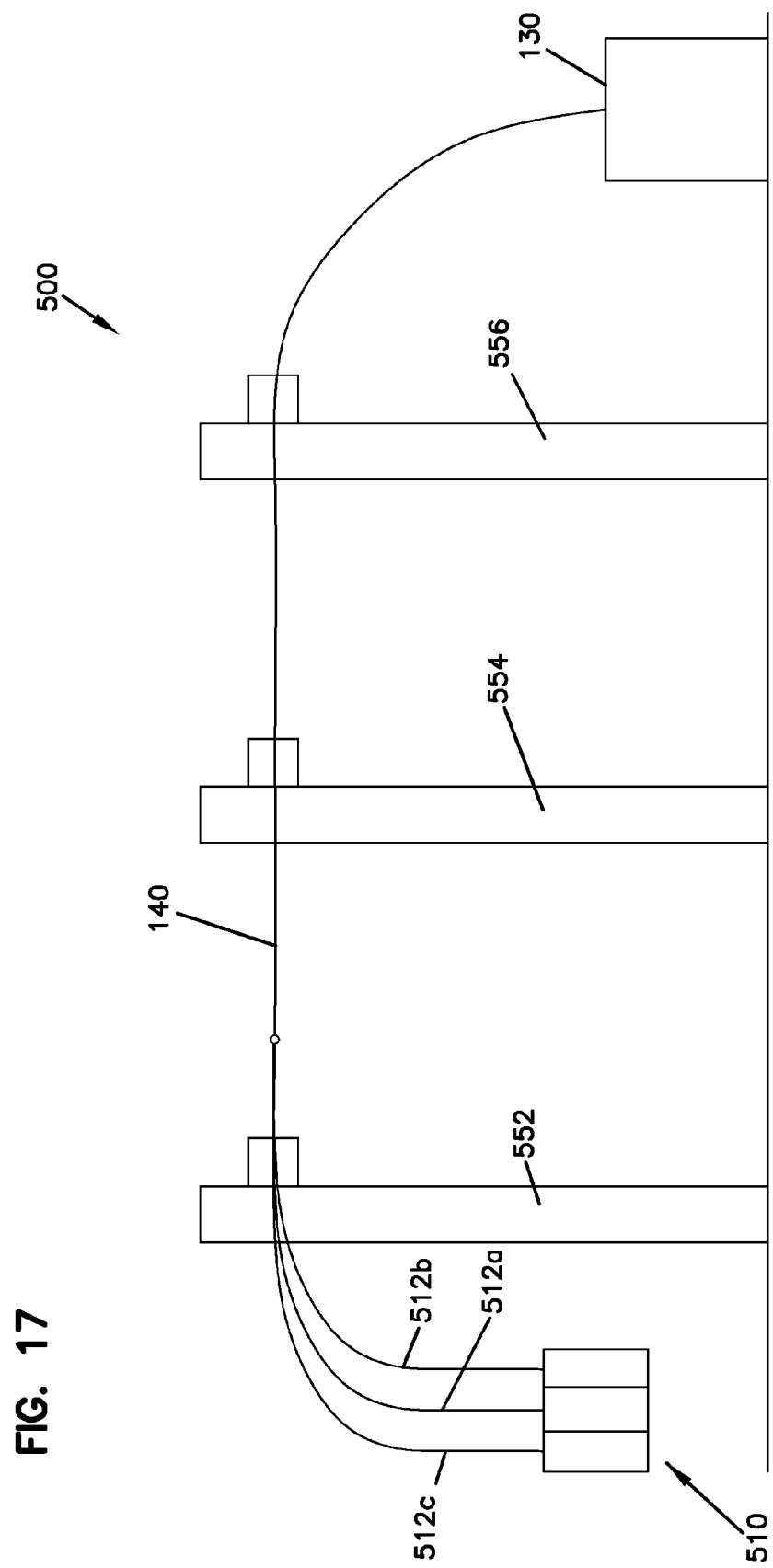

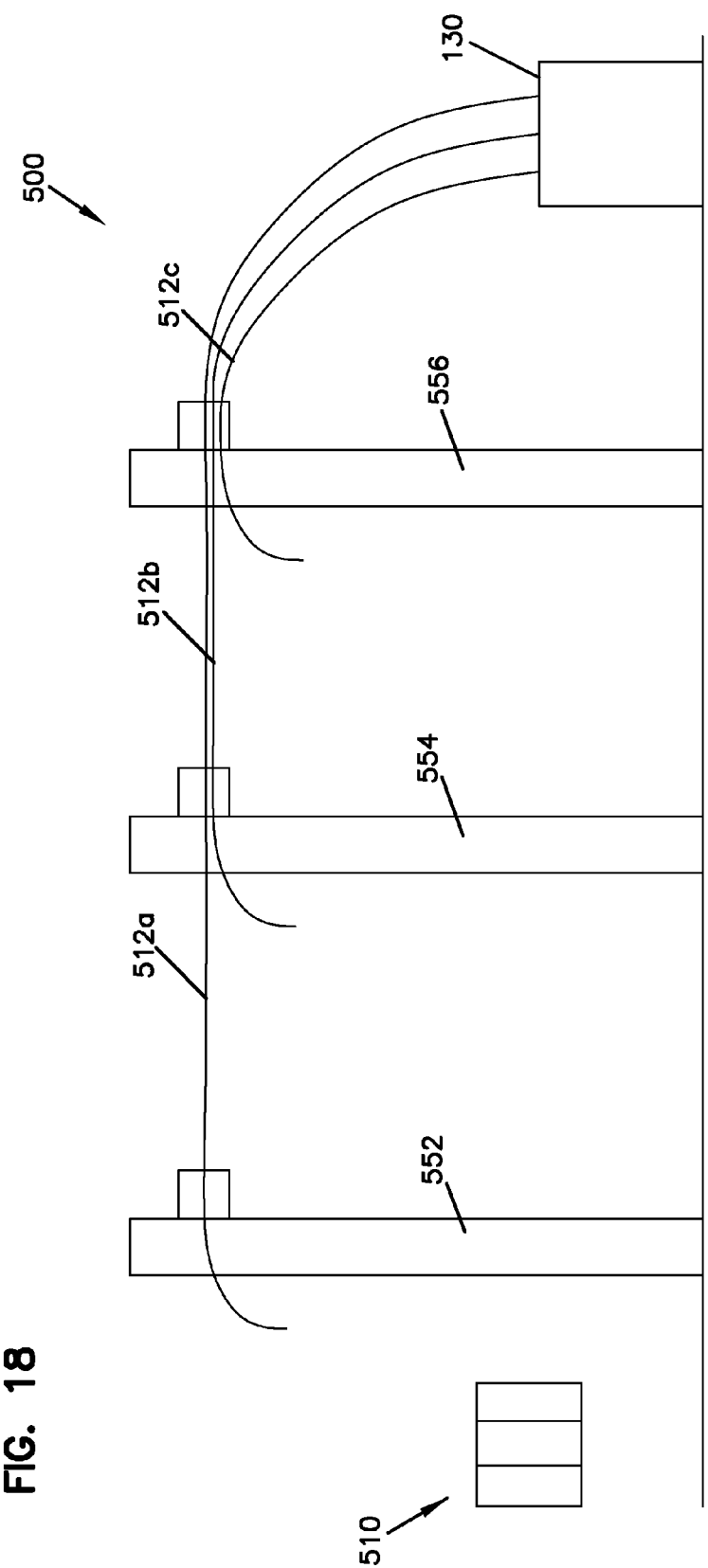

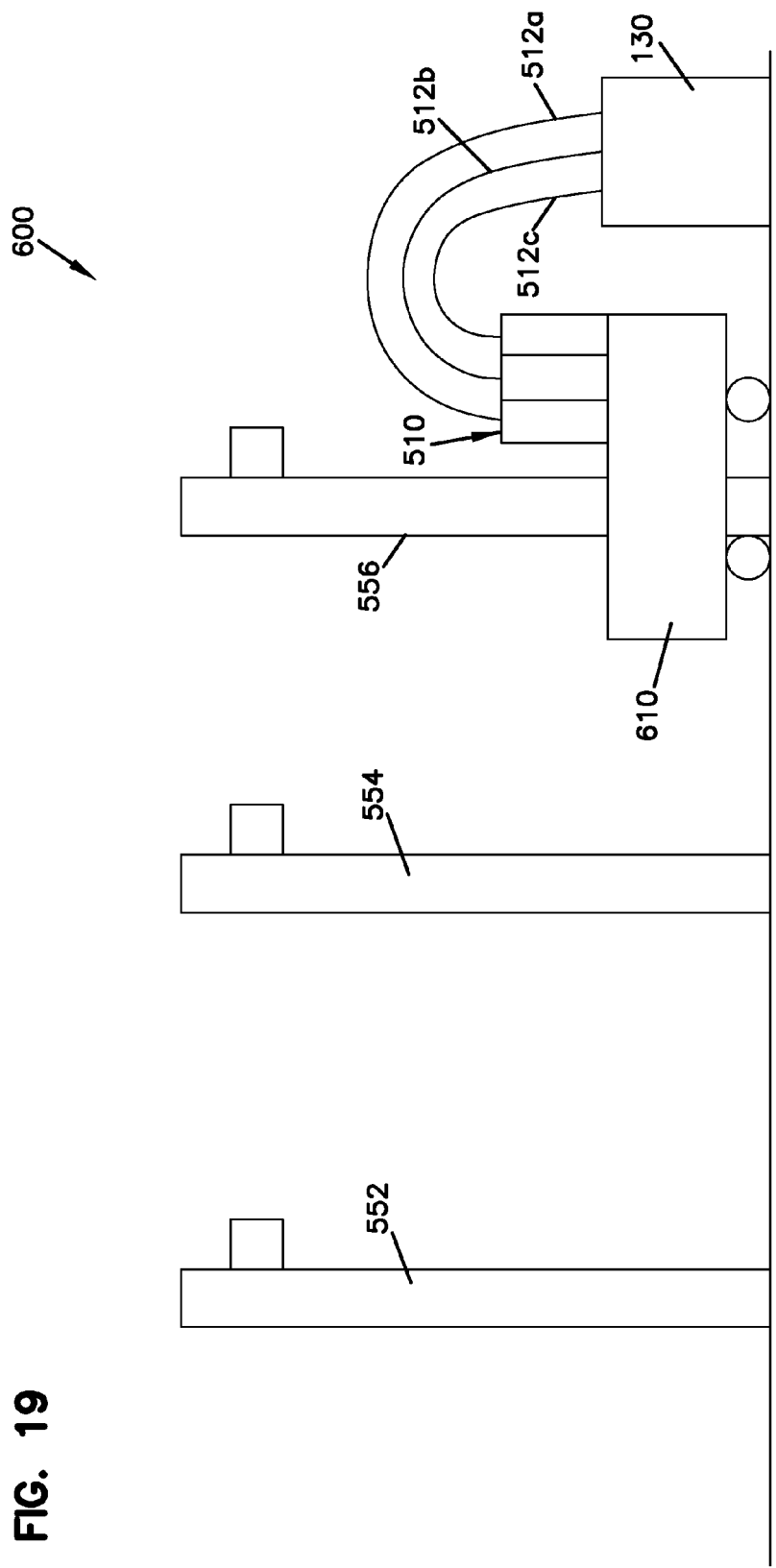

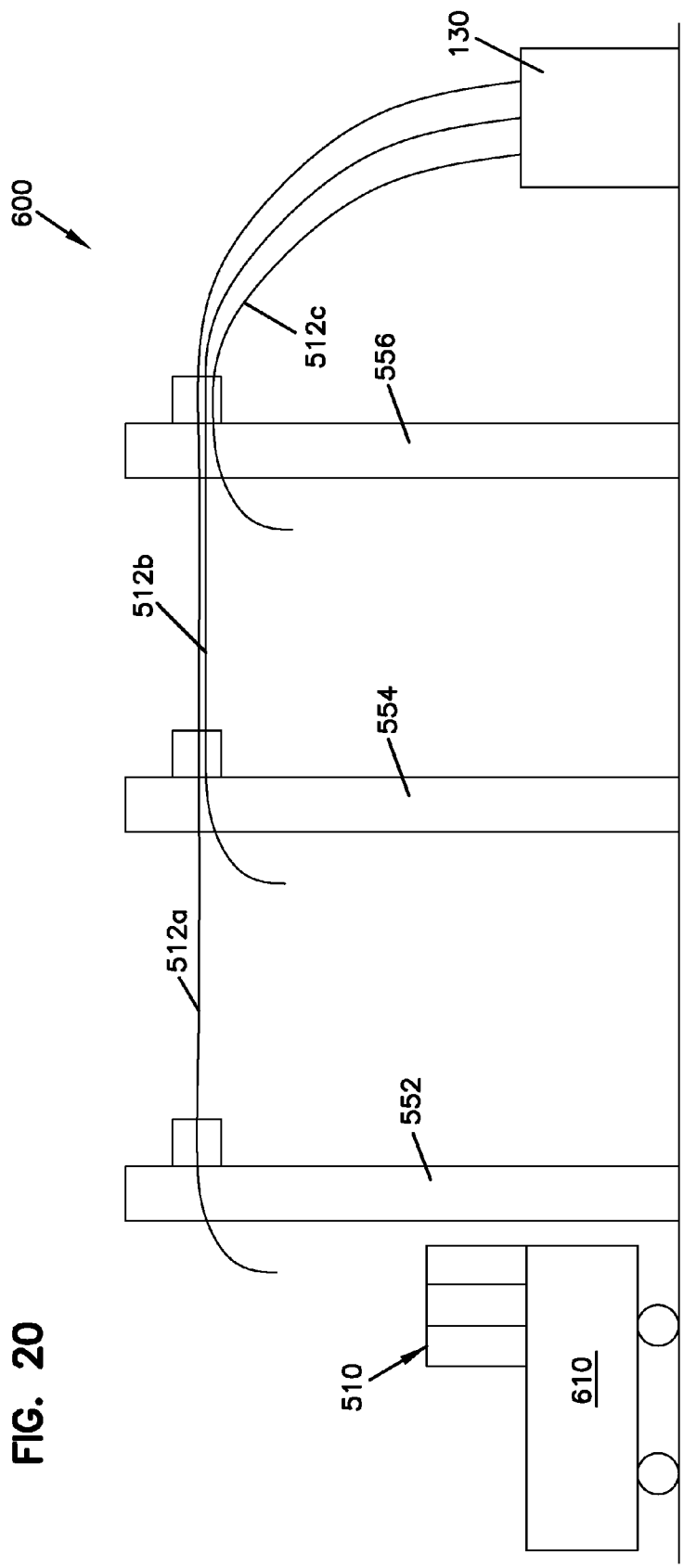

RAPID DEPLOYMENT PACKAGING FOR OPTICAL FIBER

RELATED APPLICATION(S)

This application claims the benefit of U.S. patent application Ser. No. 61/706,969 filed on Sep. 28, 2012 and U.S. patent application Ser. No. 61/846,286 filed on Jul. 15, 2013, the entireties of which are hereby incorporated by reference.

BACKGROUND

As demand for telecommunications increases, fiber optic networks are being extended in more and more areas. Fiber optic enclosures are used to provide a subscriber access point to the fiber optic network. These fiber optic enclosures are connected to the fiber optic network through subscriber cables connected to a network hub. The length of subscriber cable needed between the fiber optic enclosure and the network hubs varies depending upon the location of the fiber optic enclosure with respect to the network hubs. As a result, there is a need for fiber optic deployment packaging arrangements that can effectively manage varying lengths of subscriber cable.

SUMMARY

In one aspect, a method for installing fiber optic cables between a fiber distribution hub and a plurality of access points includes: pulling the fiber optic cables from a farthest access point to the fiber distribution hub, with each of the fiber optic cables being of a different length and sized to be positioned adjacent to one of the plurality access points when the fiber optic cables are pulled to the fiber distribution hub; connecting a pulled end of the each of the fiber optic cables to the fiber distribution hub; and connecting a free end of each of the fiber optic cables to a respective access point to connect each of the access points to the fiber distribution hub.

In another aspect, a method for installing fiber optic cables between a fiber distribution hub and a plurality of access points includes: pulling the fiber optic cables, with each of the fiber optic cables being of a different length and sized to be positioned adjacent to one of the plurality access points when the fiber optic cables are pulled to the fiber distribution hub; connecting an end of the each of the fiber optic cables to the fiber distribution hub; and successively connecting a free end of each of the fiber optic cables to a respective access point to connect each of the access points to the fiber distribution hub.

In yet another aspect, a method for installing fiber optic cables between a fiber distribution hub and a plurality of access points includes: pulling the fiber optic cables underground from a farthest access point to the fiber distribution hub, with each of the fiber optic cables being of a different length and sized to be positioned adjacent to one of the plurality access points when the fiber optic cables are pulled to the fiber distribution hub; connecting a pulled end of the each of the fiber optic cables to the fiber distribution hub; and successively connecting a free end of each of the fiber optic cables to a respective access point to connect each of the access points to the fiber distribution hub.

DESCRIPTION OF THE DRAWINGS

FIG. 15 shows an example sled used to carry the fiber optic cables in the process of FIG. 1.
FIG. 16 shows a process for deploying fiber optic cables from a fiber distribution hub to a plurality of multi-port service terminals.
FIG. 17 shows additional details of the process of FIG. 16.
FIG. 18 shows additional details of the process of FIG. 16.
FIG. 19 shows a process for deploying fiber optic cables from a fiber distribution hub to a plurality of multi-port service terminals.
FIG. 20 shows additional details of the process of FIG. 19.

DETAILED DESCRIPTION

The present disclosure is directed towards systems and method for deploying fiber optics in the field. Although not so limited, an appreciation of the various aspects of the present disclosure will be gained through a discussion of the examples provided below.

FIGS. 1-12 show an example process 100 for deploying fiber optic cables 110 in the field.

In this example, the fiber optic cables 110 are flat flex cables including at least 12 fibers per flex. The fibers in the fiber optic cables 110 can be terminated using various connectors, such as Multi-fiber Push-On (MPO) connectors or Hardened Multifiber Optical Connectors (HMFOC), as described further below.

With this 12 fiber per flex implementation and the use of small-form connectors such as HMFOCs, the footprint (e.g., diameter) for the fiber optic cables 110 is minimized. Further, the bend radii for the 12 fiber flex are such that slack can be dealt with more easily. If more than 12 fibers are needed for a particular access point, an additional fiber optic cable 110 can be run for that access point.

In this example, the length of each of the fiber optic cables 110 can vary between 50 meters and 600 meters, although other fiber types and lengths can be used. In some examples, a precise measurement is made so that the fiber optic cables 110 are a particular length, as described further below. In other examples, the length of the fiber optic cables 110 is less important as long as the cables are sufficiently long to reach an access point. In such implementations, the fiber optic cables 110 are small in diameter and therefore have small bend diameters, thereby allowing the slack to be addressed more easily. This can reduce fulfillment and installation times.

Figure 1:
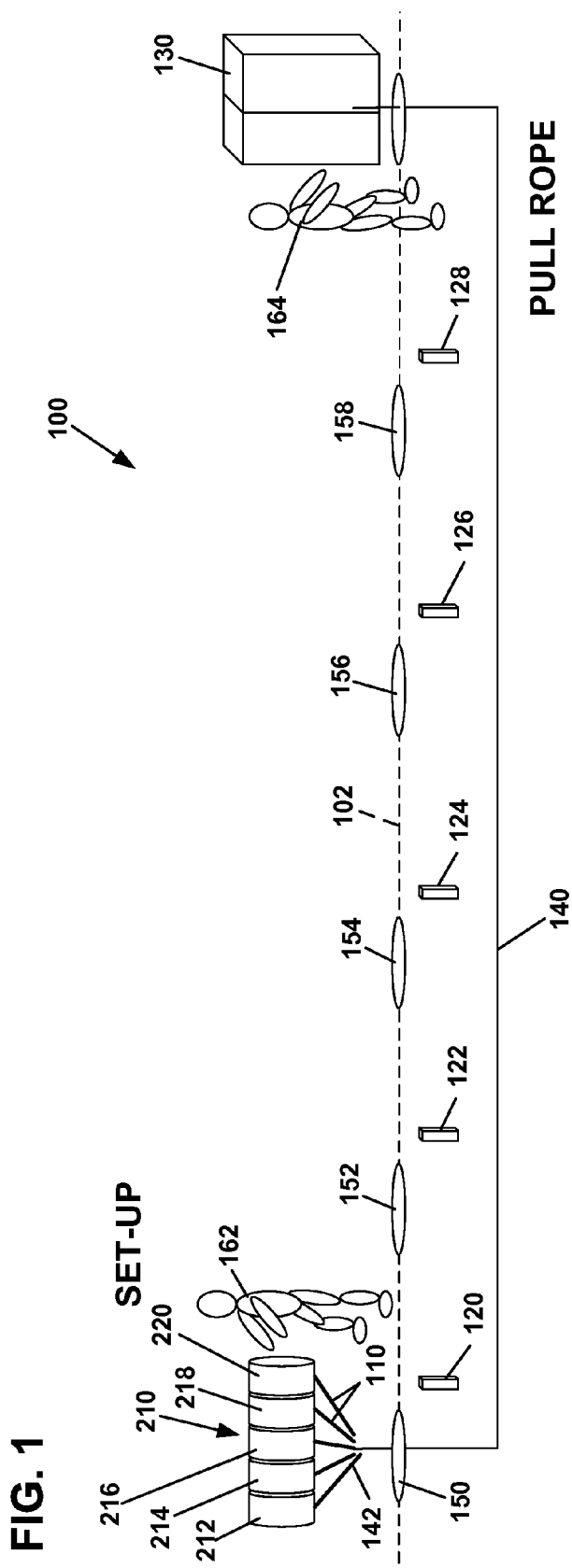
FIG. 1 shows a process for deploying fiber optic cables from a fiber distribution hub to a plurality of multi-port service terminals.

As shown in FIG. 1, the fiber optic cables 110 are positioned to be delivered to a plurality of fiber optic enclosures or subscriber access points, which are referred to herein as Multi-Port Service Terminals (MSTs) 120, 122, 124, 126, 128, located in the field. In this example, each of the MSTs 120, 122, 124, 126, 128 is to be connected to a Fiber Distribution Hub (FDH) 130. The MSTs 120, 122, 124, 126, 128 are spaced at known distances from the FDH 130, such as in 50 meter increments. The fiber optic cables 110 are run under the ground 102 to make the connections between the FDH 130 and the MSTs 120, 122, 124, 126, 128.

In this example, the fiber optic cables 110 are positioned on a spool assembly 210. The spool assembly 210 includes a plurality of spools 212, 214, 216, 218, 220. Each of the spools 212, 214, 216, 218, 220 includes a fiber optic cable 110 of a specified length, as described further below.

Figure 13:
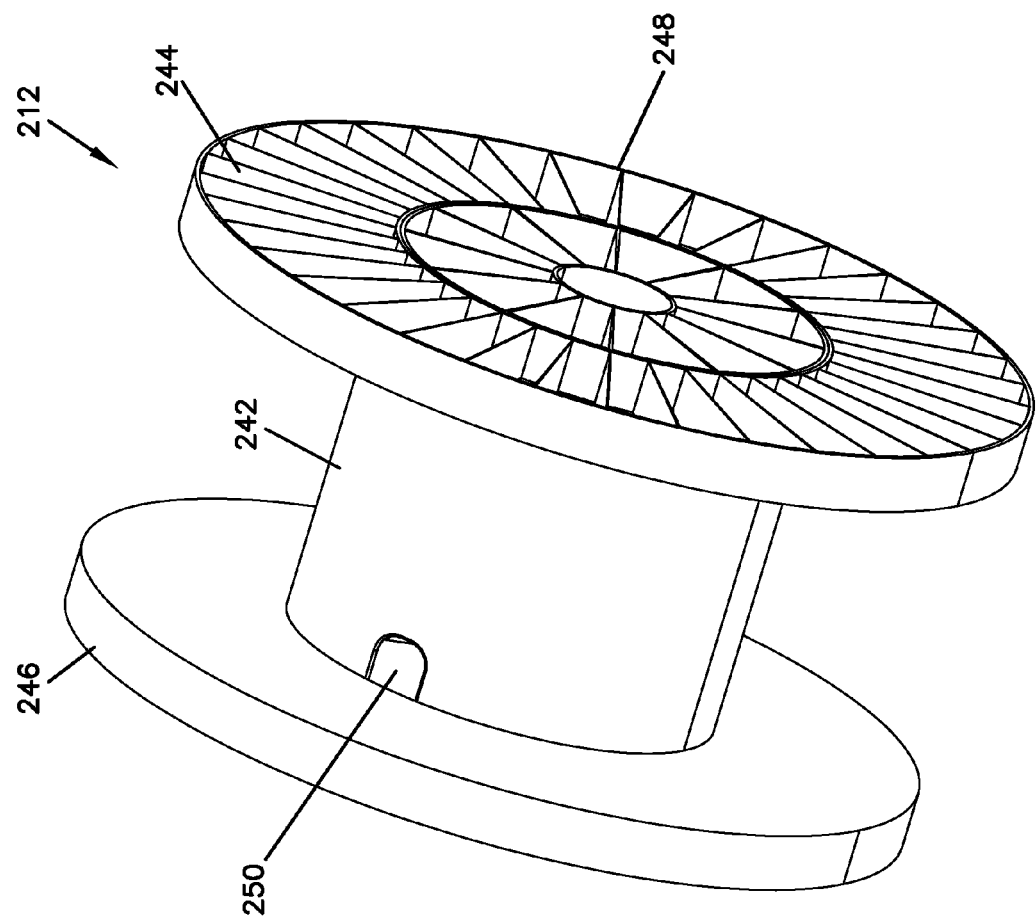
FIG. 13 shows an example spool for use in the process of FIG. 1.
Figure 14:
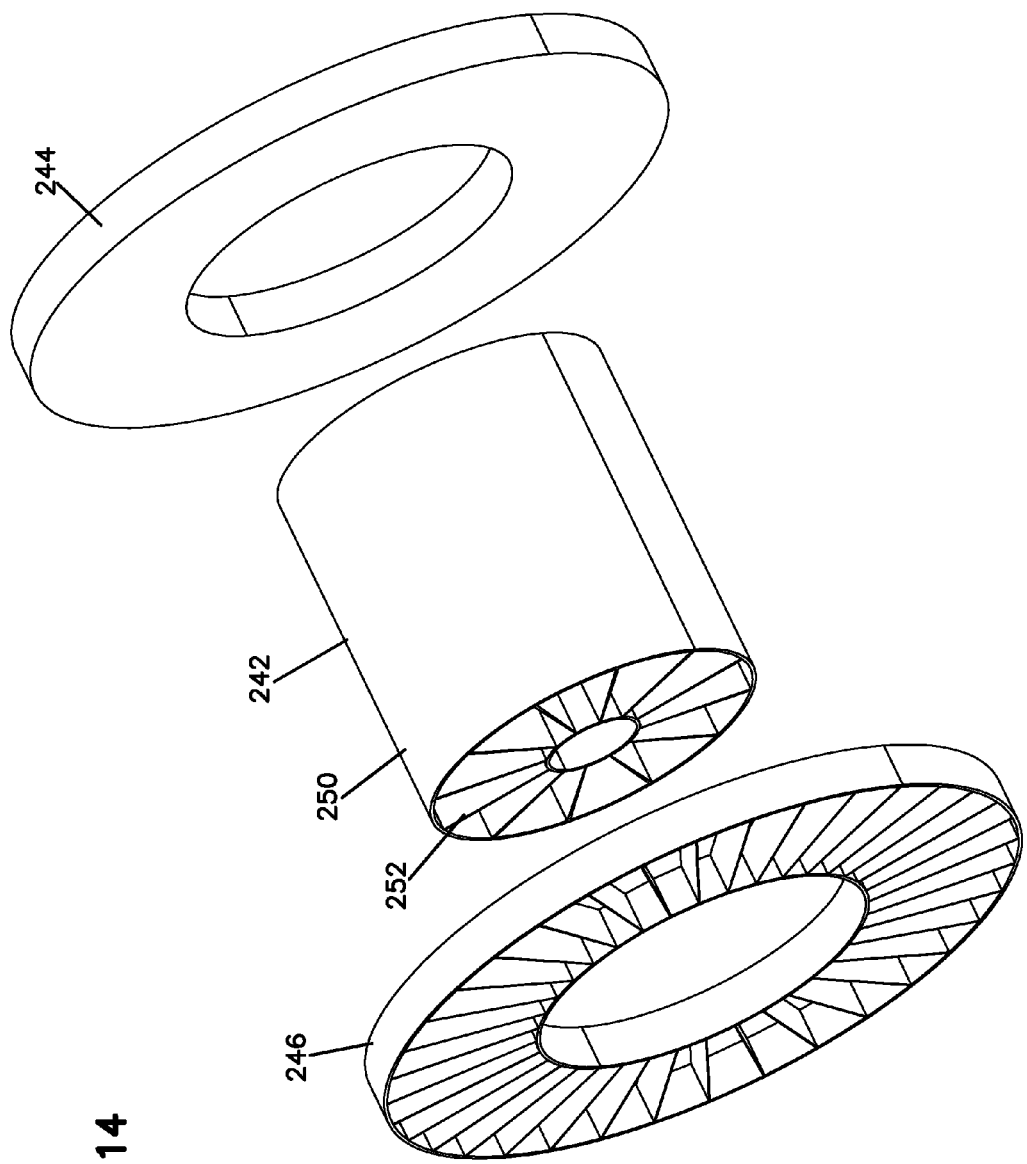
FIG. 14 shows an exploded view of the spool of FIG. 13.

Referring to FIGS. 13-14, the spool 212 is shown. The spool 212 includes a circular body 242 bounded by end members 244, 246. The fiber optic cable 110 is wound onto the body 242. A connector (e.g., MPO or HMFOC) associated with the end of the fiber optic cable 110 that is first wound onto the body 242 is positioned through a hole 250 formed in the body 242 so that the connector is positioned within an internal space 252 of the body 242 and is thereby protected.

The body 242 defines a central opening 248 that allows the spool 212 to be mounted to the spool assembly 210. For example, an axle is extended through each of the openings 248 in each of the spools 212, 214, 216, 218, 220 so that the spools 212, 214, 216, 218, 220 can spin to deliver the fiber optic cables 110 during installation, as described below.

In this example, the spools 212, 214, 216, 218, 220 are made of plastic and are molded. In other examples, the spools can be made of other materials, such as metal.

Referring again to FIG. 1, during installation, a line 140 is run under the ground 102 from the FDH 130 to the outermost MST 120. This line 140 can be run using known techniques, such as by blowing the line 140 through a conduit positioned under the ground 102.

Once the line is in place, the outermost end 142 of the line 140 is accessed from underground through an access opening 150, such as a manhole. The end 142 is connected to each of the fiber optic cables 110 on the spool assembly 210.

Referring now to FIG. 15, in this example, the end 142 of the line 140 is connected to a sled 310 at an opening 312 formed by the sled 310. The sled 310 includes a plurality of connector locations 314. Each of the connector locations 314 is configured to accept a connector housing 326 associated with a connector (e.g., MPO or HMFOC) positioned at a free end of one of the fiber optic cables 110. Although only four connector locations 314 are shown, the sled 310 can include more or fewer connector locations 314, as needed. For example, for the embodiment depicted in FIG. 1, the sled 310 can include five connector locations 314, one for each of the connectors associated with the fiber optic cables 110.

In this example, each of the connector housings 326 engages a protrusion 316 formed at each of the connector locations 314 to couple the connector housings 326 to the sled 310. Additional details about the connector housings 326 can be found in U.S. patent application Ser. No. 12/775, 011 filed on May 6, 2010, the entirety of which is hereby incorporated by reference.

Referring again to FIG. 1, once the sled 310 is coupled to the line 140, each of the fiber optic cables 110 is ready to be installed underground and connected to the FDH 130. During installation, two technicians 162, 164 are needed. The technician 162 is located at the spool assembly 210 to manage the fiber optic cables 110. The technician 164 is located at the FDH 130 to manage the line 140 and to connect the fiber optic cables 110 to the FDH 130.

Figure 2:
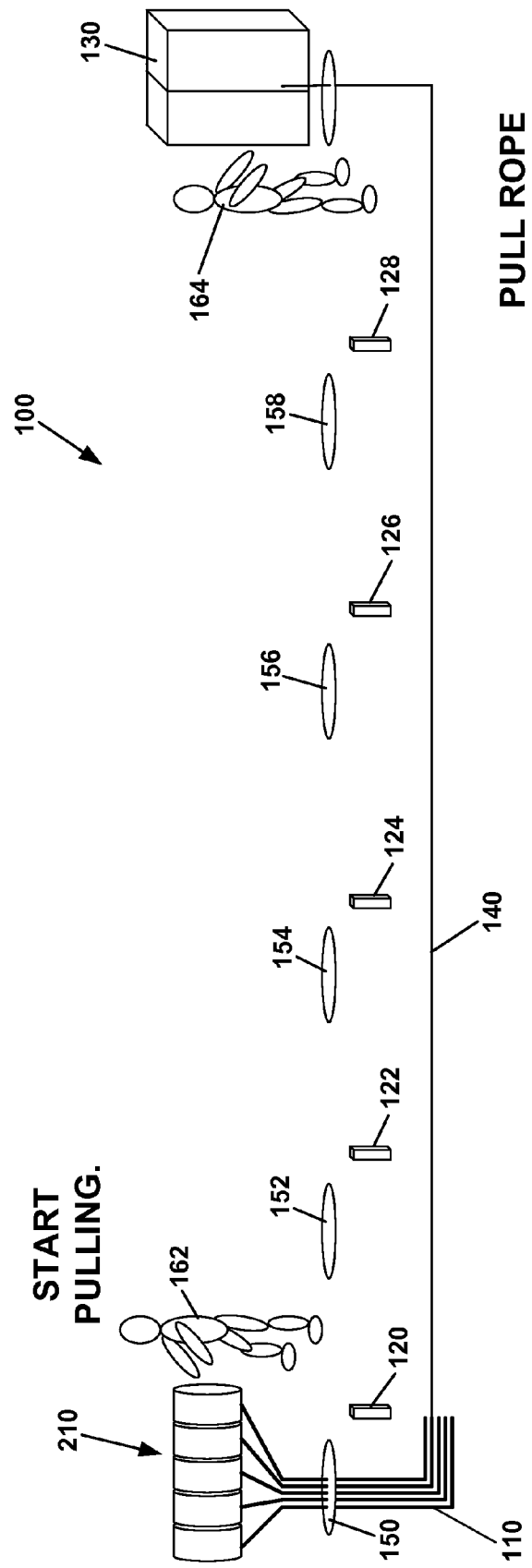
FIG. 2 shows additional details of the process of FIG. 1.

Referring now to FIG. 2, the fiber optic cables 110 are pulled by the line 140 through the access opening 150 and underground.

Figure 3:
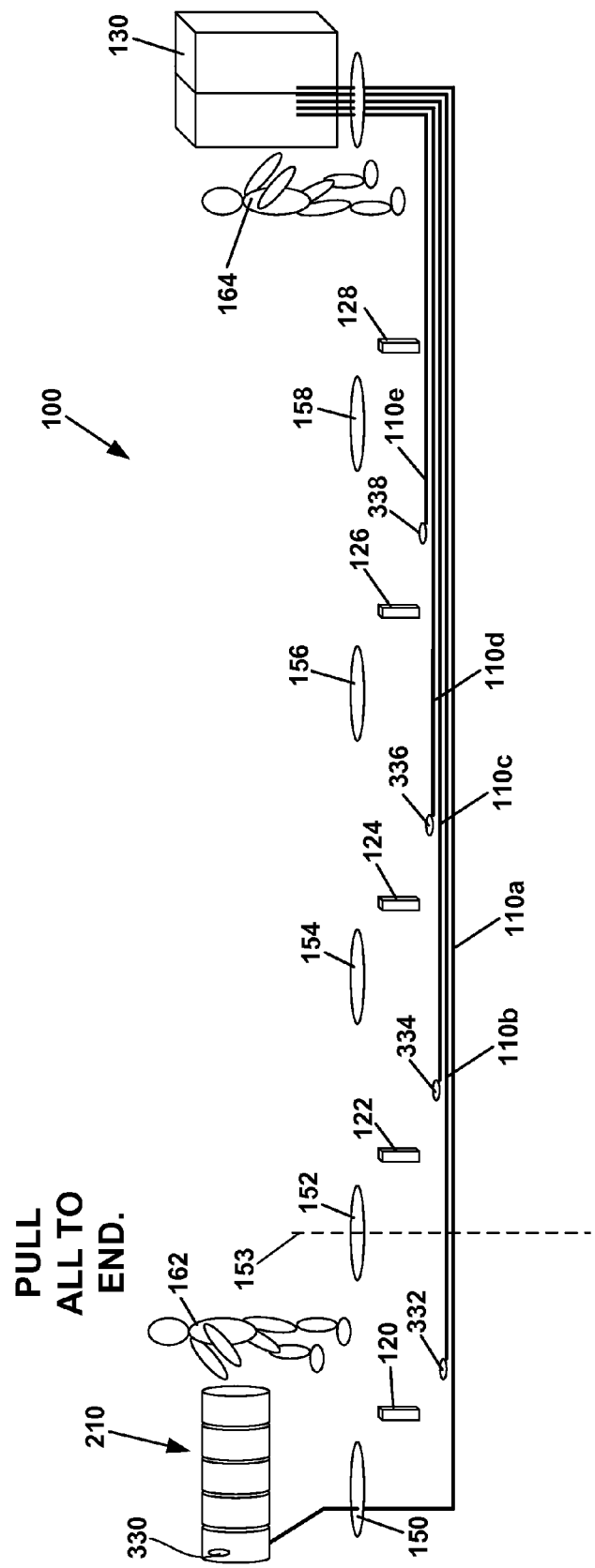
FIG. 3 shows additional details of the process of FIG. 1.

In FIG. 3, the fiber optic cables 110 have been pulled underground to the FDH 130 by the line 140. Thereupon, the technician 164 can undo each of the connector housings 326 from the sled 310, remove the connector housings 326 to access the connectors, and connect the connector associated with each of the fiber optic cables 110 to the FDH 130.

As illustrated, each of the fiber optic cables 110 is of a different length, so that as the fiber optic cables 110 are pulled underground, each of the fiber optic cables 110 terminates adjacent to one of the MSTs 120, 122, 124, 126, 128. For example, in this embodiment, the fiber optic cable 110e is of a first length sized so that a connector 336 at the free end of the fiber optic cable 110e is positioned adjacent the MST 128 and the access opening 158. Similarly, the fiber optic cable 110d is longer than that of the fiber optic cable 110e so that the free end of the fiber optic cable 110d is positioned adjacent the MST 126 and the access opening 156. The fiber optic cables 110a, 110b, 110c are similarly sized so that connectors 330, 332, 334 are positioned adjacent MSTs 120, 122, 124, respectively.

For example, as depicted, the connector 332 is positioned adjacent to a center line 153 associated with the access opening 152. This allows the technician 162 to access the connector 332 through the access opening 152, as described further below.

In one example, a distance between the FDH 130 and each of the MSTs 120, 122, 124, 126, 128 is known, and the lengths of the fiber optic cables 110a, 110b, 110c, 110d, 110e are configured when placed on the spools 212 so that the connectors 330, 332, 334, 336, 338 are positioned adjacent to the respective MSTs 120, 122, 124, 126, 128. The distance between each MST can be at regular intervals (e.g., 50 meters) or can be customized for a particular topography. For example, in the embodiment shown, the fiber optic cable 110a is approximately 250 meters in length, the fiber optic cable 110b is 200 meters, the fiber optic cable 110c is 150 meters, the fiber optic cable 110d is 100 meters, and the fiber optic cable 110e is 50 meters.

Figure 4:
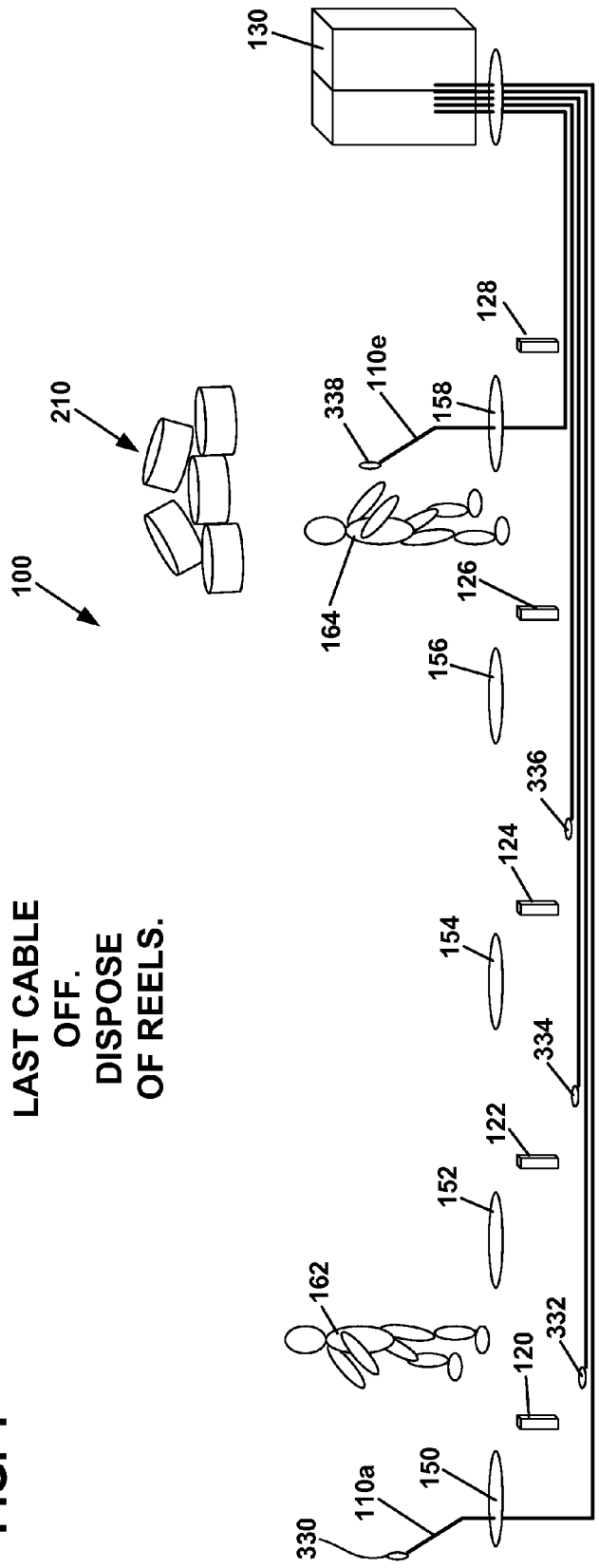
FIG. 4 shows additional details of the process of FIG. 1.

Referring now to FIG. 4, once the fiber optic cables 110 have been completely pulled, the final connector 330 is freed from the respective spool 212 and the spool assembly 210 is disassembled by the technician 162. For example, the spools 212 can be disposable and/or recyclable. In addition, the technician 164 moves to the access opening 158 and retrieves the connector 338 associated with the fiber optic cable 110e.

Figure 5:
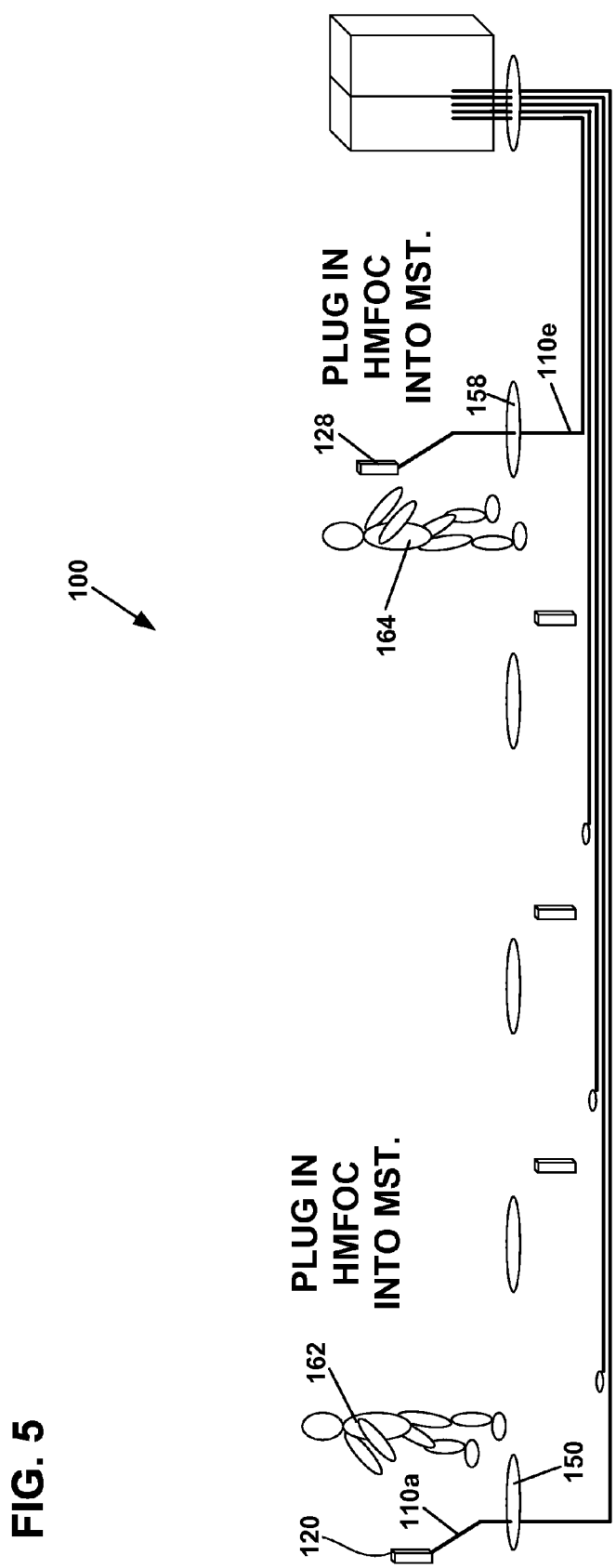
FIG. 5 shows additional details of the process of FIG. 1.

As shown in FIG. 5, the technician 164 connects the connector 338 of the fiber optic cable 110e to the MST 128. Likewise, the technician 162 connects the connector 330 of the fiber optic cable 110a to the MST 120.

Figure 6:
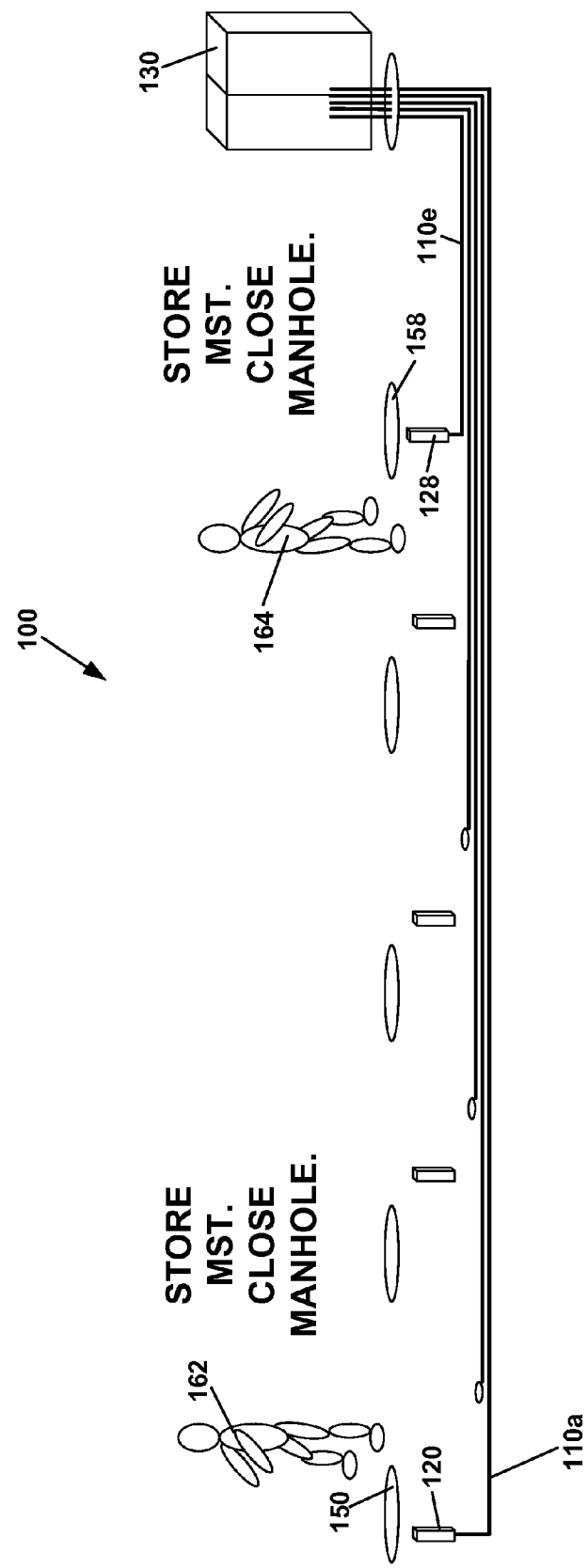
FIG. 6 shows additional details of the process of FIG. 1.

Next, at FIG. 6, the MSTs 120, 128 are replaced in the access openings 150, 158 below ground, and the access openings 150, 158 are covered (e.g., using manhole covers). At this point, the MSTs 120, 128 are connected to the FDH 130.

Figure 7:
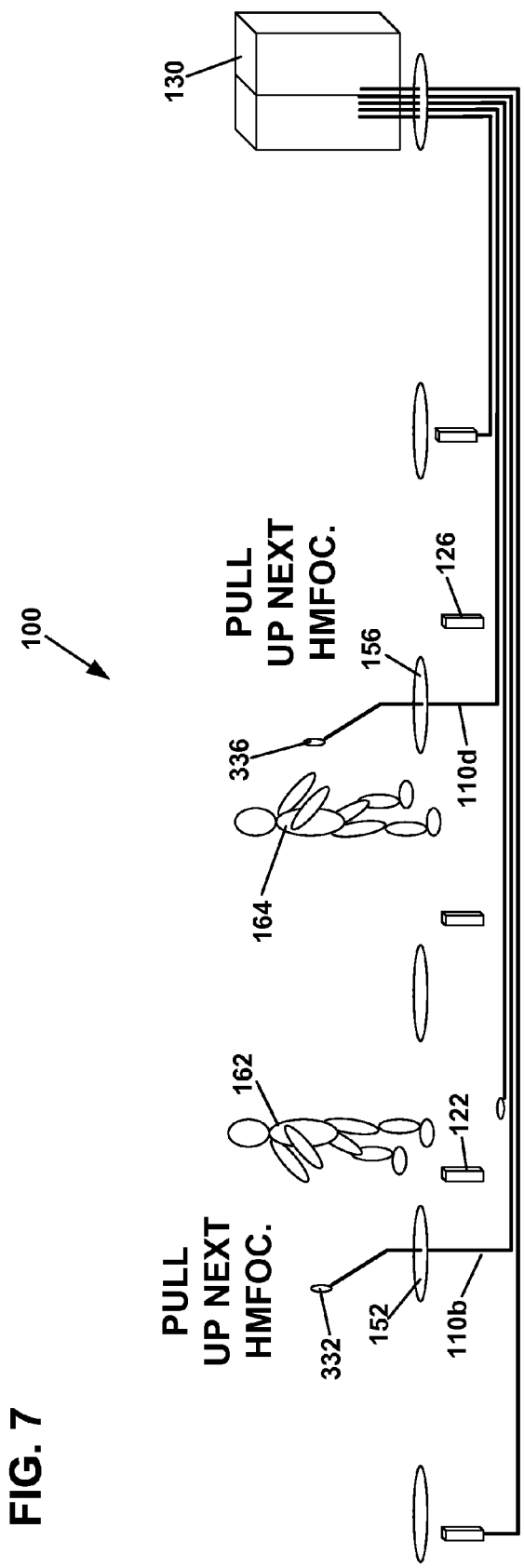
FIG. 7 shows additional details of the process of FIG. 1.

Next, at FIG. 7, the technician 162 moves to the access opening 152, and the technician 164 moves to the access opening 156. The connectors 332, 336 of the fiber optic cables 110b, 110d are thereupon accessed.

Figure 8:
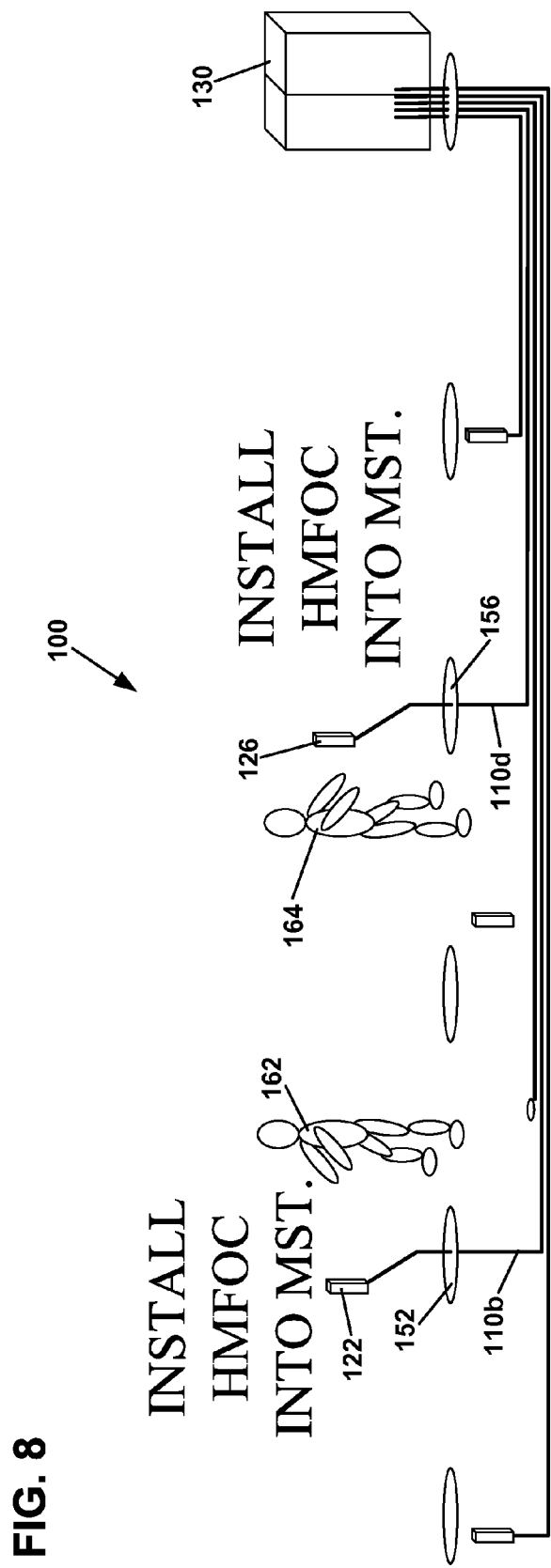
FIG. 8 shows additional details of the process of FIG. 1.
Figure 9:
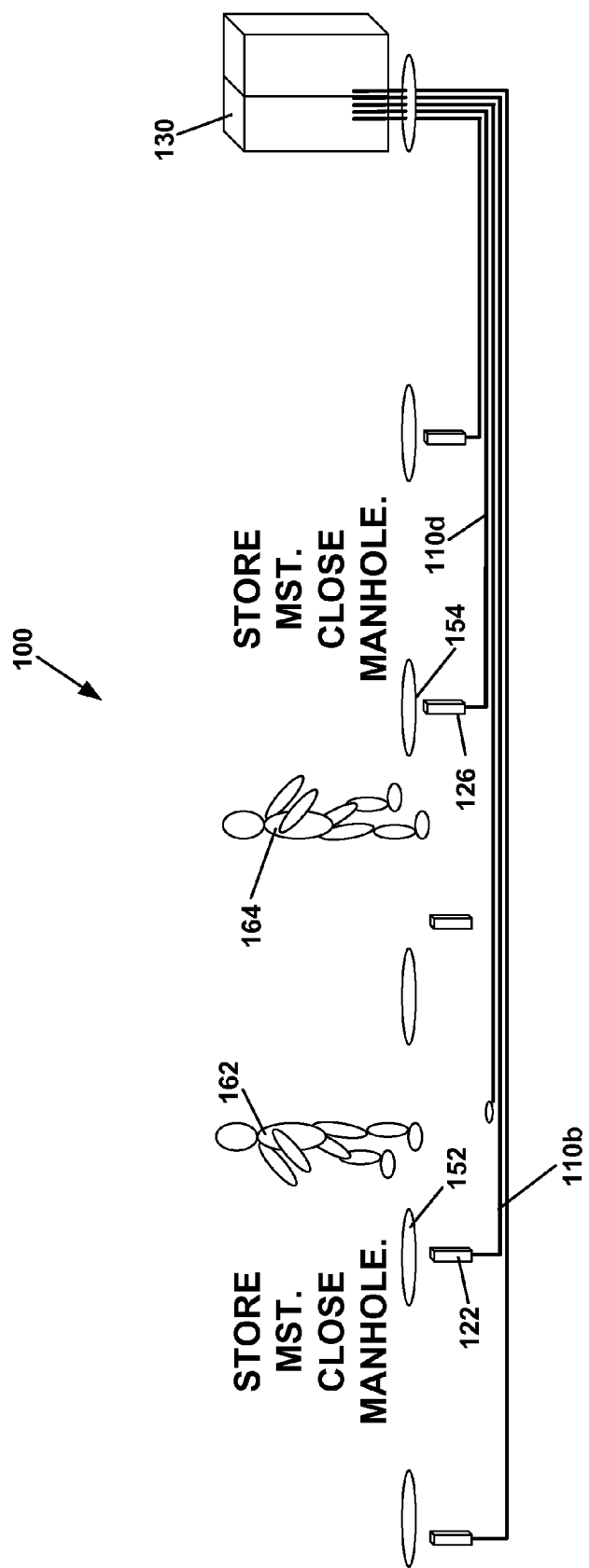
FIG. 9 shows additional details of the process of FIG. 1.

At FIGS. 8-9, the connectors 332, 336 are connected to the respective MSTs 122, 126, and the MSTs 122, 126 are stored underground and the access openings 152, 156 closed. Thereupon, the MSTs 122, 126 are connected to the FDH 130.

Figure 10:
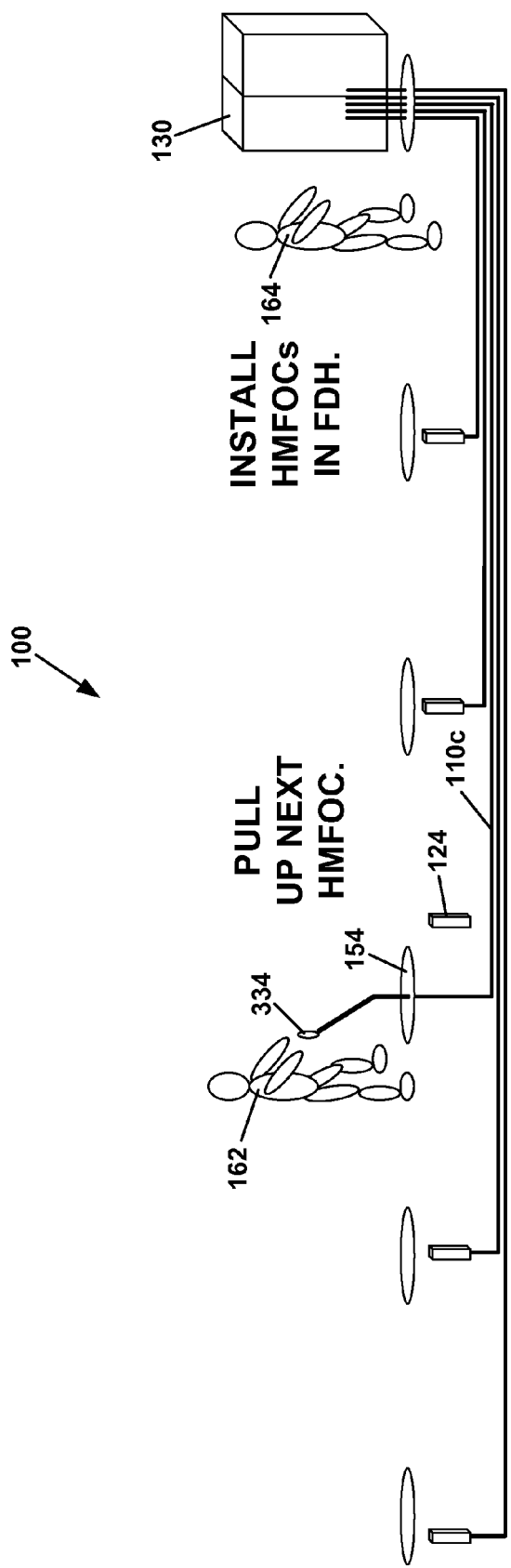
FIG. 10 shows additional details of the process of FIG. 1.
Figure 11:
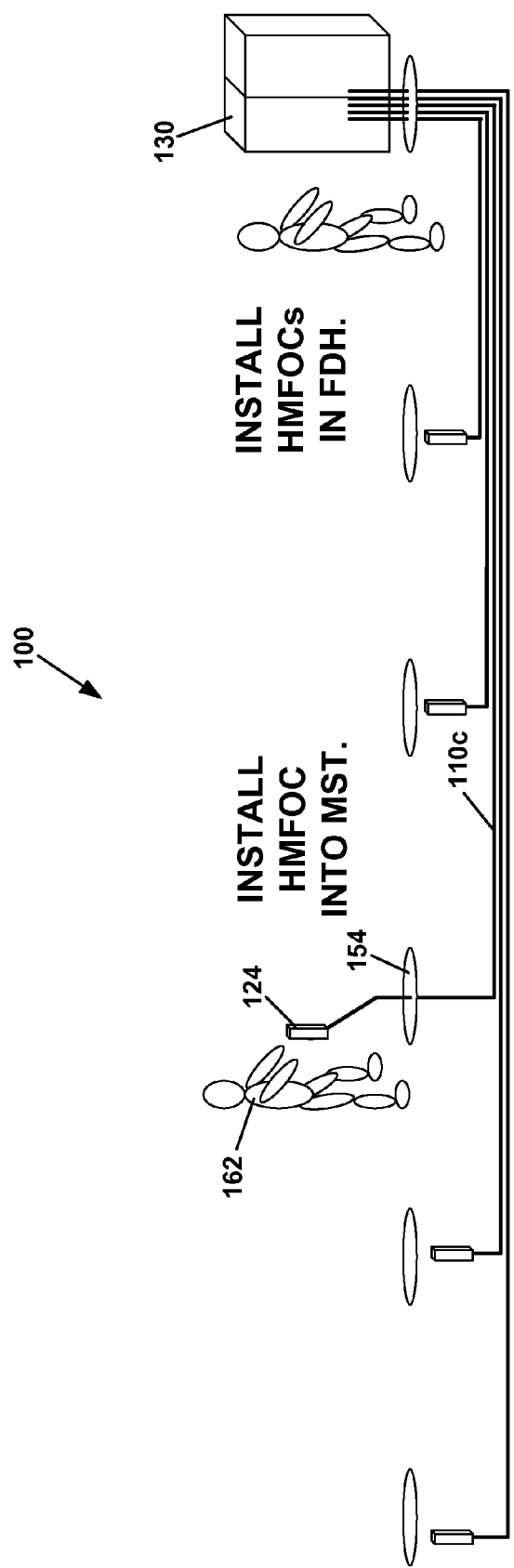
FIG. 11 shows additional details of the process of FIG. 1.
Figure 12:
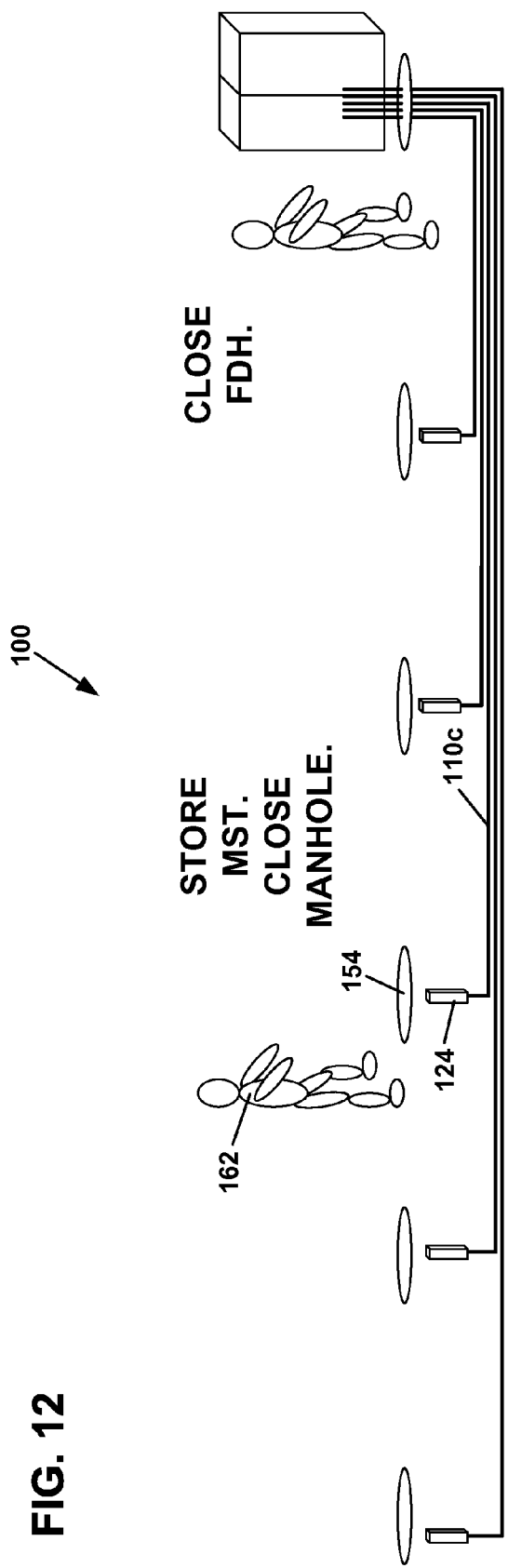
FIG. 12 shows additional details of the process of FIG. 1.

Finally, at FIGS. 10-12, the technician 162 moves to the access opening 154. The connector 334 of the fiber optic cable 110c is thereupon accessed. The connector 334 is connected to the MSTs 124, and the MST 124 is stored underground and the access opening 152, 154 closed. Thereupon, the MST 124 is connected to the FDH 130.

At this point shown in FIG. 12, all of the MSTs 120, 122, 124, 126, 128 are connected to the FDH 130 by the fiber optic cables 110. As shown, this is accomplished by two technicians. More or fewer connections to MSTs could be accomplished in a similar manner. For example, in another embodiment, more than five MSTs can be connected to a FDH.

Once the MSTs 120, 122, 124, 126, 128 are connected to the FDH 130, the MSTs 120, 122, 124, 126, 128 can be terminated to various structures, such as homes or office buildings, using fiber and/or copper.

Referring now to FIGS. 16-18, another example process 500 is shown for deploying fiber optic cables 512a-512c in the field. The process 500 is similar to those described above, except the cables 512a-512c are deployed above the ground, rather than below the ground.

In the process 500, the line 140 is run from the FDH 130, above the ground along a plurality of utility poles 552, 554, 556, and is attached to the fiber optic cables 512a, 512b, 512c on a spool assembly 510. The line 140 is used to pull the fiber optic cables 512a-512c aerially between each of the utility poles 552, 554, 556 and to the FDH 130. As shown in FIG. 18, the fiber optic cables 512a-512c are sized so that each of the ends of the cables are positioned at respective poles when the fiber optic cables 512a-512c are pulled to the FDH 130. Specifically, the fiber optic cable 512a is sized to terminate at the pole 552, the fiber optic cable 512b is sized to terminate at the pole 554, and the fiber optic cable 512c is sized to terminate at the pole 556.

In some examples, the fiber optic cables 512a-512c can be pulled directly by the line 140, attached to a messenger wire, and/or attached to an existing line running between the poles. In another example, the fiber optic cables 512a-512c can be lashed together in a manner such as that described in U.S. patent application Ser. No. 13/111,606 filed on May 19, 2011, the entirety of which is hereby incorporated by reference.

Referring now to FIGS. 19-20, a similar process 600 is depicted. However, in the process 600, the fiber optic cables 512a-512c originate at the FDH 130, and the cables are pulled in an opposite direction towards the poles 552, 554, 556. Each of the fiber optic cables 512a-512c is again sized so that the cables terminate at each respective pole 552, 554, 556.

In the depicted example, the spool assembly 510 is mounted to a motorized vehicle 610 (e.g., a truck). The fiber optic cables 512a-512c are affixed to the FDH 130, and the vehicle 610 drives away from the FDH 130. As the vehicle 610 moves, the fiber optic cables 512a-512c are spooled out of the spool assembly 510. As each pole 552, 554, 556 is encountered, the fiber optic cables 512a-512c are lifted and affixed to the pole 556, then pole 554, and then pole 552. As above, each is sized to extend to the desired pole 552, 554, 556, as shown in FIG. 20.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for installing fiber optic cables between a fiber distribution hub and a plurality of access points, the method comprising:
    pulling the fiber optic cables from a farthest access point to the fiber distribution hub, with each of the fiber optic cables being of a different length and sized to be positioned adjacent to one of the plurality access points when the fiber optic cables are pulled to the fiber distribution hub;
    connecting a pulled end of the each of the fiber optic cables to the fiber distribution hub; and
    connecting a free end of each of the fiber optic cables to a respective access point to connect each of the access points to the fiber distribution hub.

2. The method of claim 1, wherein the pulling of the fiber optic cables further comprises pulling the fiber optic cables underground.

3. The method of claim 1, wherein the pulling of the fiber optic cables further comprises pulling the fiber optic cables above ground.

4. The method of claim 1, further comprising spooling each of the fiber optic cables onto one of a plurality of spools.

5. The method of claim 4, further comprising mounting the plurality of spools to a spool assembly.

6. The method of claim 5, further comprising spooling the fiber optic cables using the spool assembly as the fiber optic cables are pulled.

7. The method of claim 1, wherein each of the plurality of access points is a multi-port service terminal.

8. The method of claim 1, further comprising:
    positioning a first technician at the farthest access point; and
    positioning a second technician at the fiber distribution hub.

9. The method of claim 8, further comprising:
    allowing the first technician to manage the fiber optic cables as the fiber optic cables are pulled; and
    allowing the second technician to manage a line that is used to pull the fiber optic cables.

10. The method of claim 9, further comprising allowing the first and second technicians to work towards one another as the first and second technicians connect free ends of each of the fiber optic cables to respective access points.

11. A method for installing fiber optic cables between a fiber distribution hub and a plurality of access points, the method comprising:
    pulling the fiber optic cables, with each of the fiber optic cables being of a different length and sized to be positioned adjacent to one of the plurality access points when the fiber optic cables are pulled to the fiber distribution hub;
    connecting an end of the each of the fiber optic cables to the fiber distribution hub; and
    successively connecting a free end of each of the fiber optic cables to a respective access point to connect each of the access points to the fiber distribution hub.

12. The method of claim 11, wherein the pulling of the fiber optic cables further comprises pulling the fiber optic cables underground from a farthest access point to the fiber distribution hub.

13. The method of claim 11, wherein the pulling of the fiber optic cables further comprising pulling the fiber optic cables above ground.

14. The method of claim 11, further comprising spooling each of the fiber optic cables onto one of a plurality of spools.

15. The method of claim 14, further comprising mounting the plurality of spools to a spool assembly.

16. A method for installing fiber optic cables between a fiber distribution hub and a plurality of access points, the method comprising:
pulling the fiber optic cables underground from a farthest access point to the fiber distribution hub, with each of the fiber optic cables being of a different length and sized to be positioned adjacent to one of the plurality access points when the fiber optic cables are pulled to the fiber distribution hub;
connecting a pulled end of the each of the fiber optic cables to the fiber distribution hub; and
successively connecting a free end of each of the fiber optic cables to a respective access point to connect each of the access points to the fiber distribution hub.

17. The method of claim 16, further comprising spooling each of the fiber optic cables onto one of a plurality of spools.

18. The method of claim 16, further comprising:
positioning a first technician at the farthest access point; and
positioning a second technician at the fiber distribution hub.

19. The method of claim 18, further comprising:
allowing the first technician to manage the fiber optic cables as the fiber optic cables are pulled; and
allowing the second technician to manage a line that is used to pull the fiber optic cables.

20. The method of claim 19, further comprising allowing the first and second technicians to work towards one another as the first and second technicians connect free ends of each of the fiber optic cables to respective access points.

\* \* \* \* \*